US010850350B2

United States Patent
Obara et al.

(10) Patent No.: US 10,850,350 B2
(45) Date of Patent: Dec. 1, 2020

(54) OPTICAL PROCESSING NOZZLE AND OPTICAL PROCESSING APPARATUS

(71) Applicant: TECHNOLOGY RESEARCH ASSOCIATION FOR FUTURE ADDITIVE MANUFACTURING, Tokyo (JP)

(72) Inventors: Go Obara, Kanagawa (JP); Hiroshi Ohno, Kanagawa (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 871 days.

(21) Appl. No.: 15/123,175

(22) PCT Filed: Mar. 15, 2016

(86) PCT No.: PCT/JP2016/058203
§ 371 (c)(1),
(2) Date: Sep. 1, 2016

(87) PCT Pub. No.: WO2017/158738
PCT Pub. Date: Sep. 21, 2017

(65) Prior Publication Data
US 2018/0093347 A1   Apr. 5, 2018

(51) Int. Cl.
*B23K 26/00*  (2014.01)
*B23K 26/06*  (2014.01)
(Continued)

(52) U.S. Cl.
CPC ............ *B23K 26/0643* (2013.01); *B05B 1/24* (2013.01); *B23K 26/0665* (2013.01);
(Continued)

(58) Field of Classification Search
CPC .............. B23K 26/0643; B23K 26/142; B23K 26/0665; B23K 26/123; B23K 26/1476;
(Continued)

(56) References Cited

U.S. PATENT DOCUMENTS

| 7,223,935 B2 | 5/2007 | Wessner |
| 2012/0145683 A1 | 6/2012 | Miyagi et al. |

(Continued)

FOREIGN PATENT DOCUMENTS

| RU | 104 488 U1 | 5/2011 |
| WO | 2015/141036 A1 | 9/2015 |

(Continued)

OTHER PUBLICATIONS

Wikipedia definition of "rotational symmetry.".*
(Continued)

*Primary Examiner* — Sang Y Paik
(74) *Attorney, Agent, or Firm* — Ladas & Parry LLP

(57) ABSTRACT

Deterioration of a shaped object is prevented. There is provided an optical processing nozzle including an optical system in which a condensing point is adjusted to a processing point, a first set of fluid mixture discharge pipes that discharges, to the processing point, a material/purge gas fluid mixture obtained by mixing a purge gas in a powder processing material, and a second set of purge gas discharge pipes that discharges a purge gas having a purge function to the first set of fluid mixture discharge pipes, each of the fluid mixture discharge pipes of the first set being associated with each of the purge gas discharge pipes of the second set.

9 Claims, 9 Drawing Sheets

(51) Int. Cl.
  *B33Y 30/00* (2015.01)
  *B29C 64/153* (2017.01)
  *B29C 64/371* (2017.01)
  *B29C 64/209* (2017.01)
  *B23K 26/142* (2014.01)
  *C23C 4/123* (2016.01)
  *B05B 1/24* (2006.01)
  *B23K 26/12* (2014.01)
  *B23K 26/14* (2014.01)
  *B22F 3/105* (2006.01)

(52) U.S. Cl.
  CPC .......... *B23K 26/123* (2013.01); *B23K 26/142* (2015.10); *B23K 26/1476* (2013.01); *B29C 64/153* (2017.08); *B29C 64/209* (2017.08); *B29C 64/371* (2017.08); *B33Y 30/00* (2014.12); *C23C 4/123* (2016.01); *B22F 2003/1056* (2013.01); *Y02P 10/295* (2015.11)

(58) Field of Classification Search
  CPC .......... C23C 4/123; B05B 1/24; B33Y 30/00; B29C 64/153; B29C 64/209; B29C 64/371
  See application file for complete search history.

(56) References Cited

U.S. PATENT DOCUMENTS

| | | | |
|---|---|---|---|
| 2014/0186549 A1 | 7/2014 | Miyagi et al. | |
| 2016/0311027 A1* | 10/2016 | Shimoyama | B22F 3/1055 |
| 2017/0120517 A1 | 5/2017 | Shimoyama | |
| 2017/0189996 A1 | 7/2017 | Garcia | |

FOREIGN PATENT DOCUMENTS

| | | |
|---|---|---|
| WO | 2015/141335 A1 | 9/2015 |
| WO | 2015/151865 A1 | 10/2015 |
| WO | 2016/001360 A1 | 1/2016 |

OTHER PUBLICATIONS

Supplementary European Search Report (SESR) dated Apr. 16, 2018 mailed in connection with European Patent Application No. EP 16 82 3142.1.
International Search (ISR) dated Jun. 7, 2016 for International Application No. PCT/JP2016/058203.
Written Opinion (WO) dated Jun. 7, 2016 for International Application No. PCT/JP2016/058203.
J-PlatPat English abstract of JP 2012/125772 A.
J-PlatPat English abstract of JP 2013/75308 A.
J-PlatPat English abstract of JP 2015/196265 A.
J-PlatPat English abstract of JP 2015-155110 A.

* cited by examiner

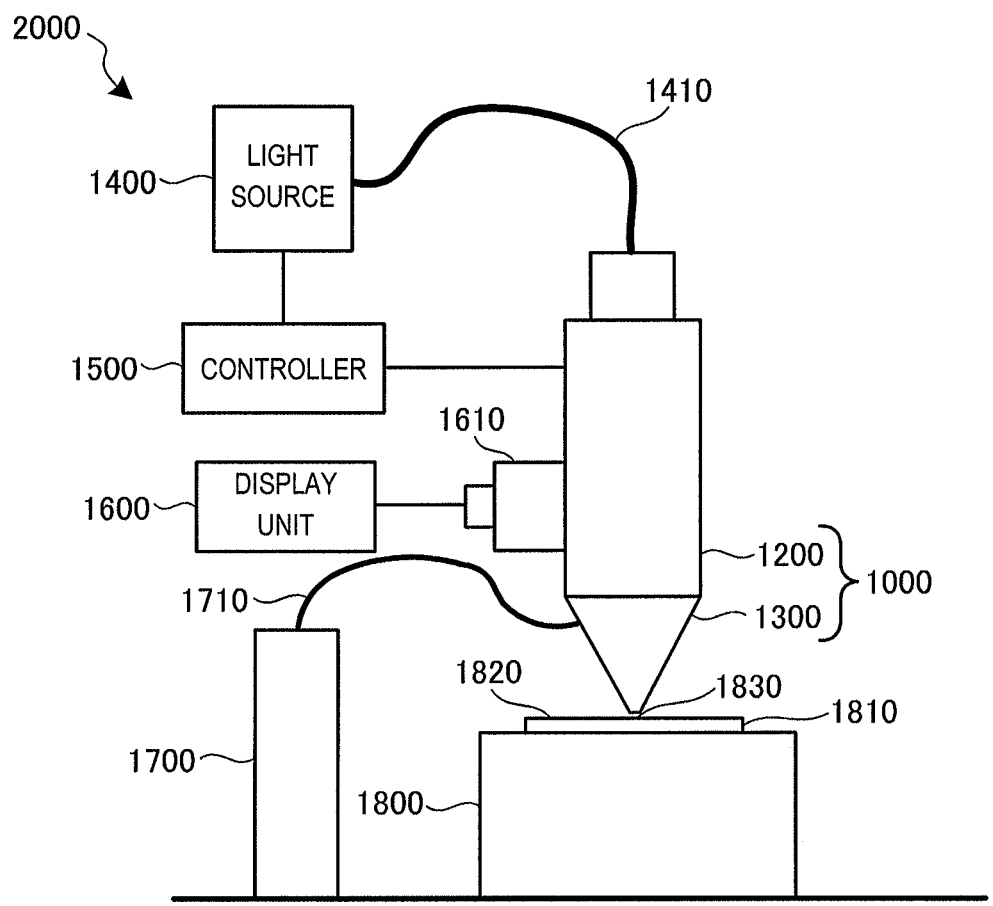
F I G. 1

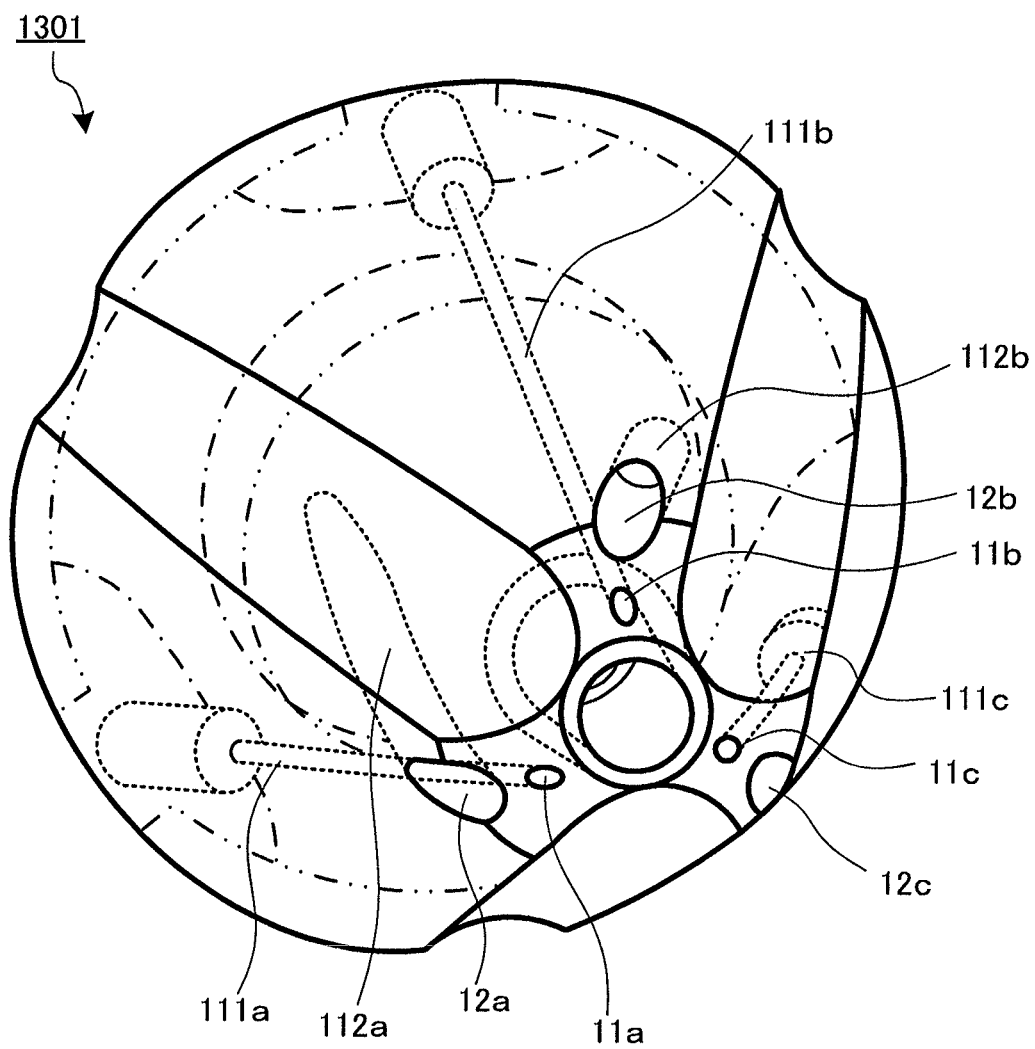
F I G. 6

OPTICAL PROCESSING NOZZLE AND OPTICAL PROCESSING APPARATUS

RELATED APPLICATION

This application is an application under 35 U.S.C. 371 of International Application No. PCT/JP2016/058203 filed on Mar. 15, 2016, the entire contents of which are incorporated herein by reference.

TECHNICAL FIELD

The present invention generally relates to an optical processing apparatus that performs shaping by irradiating a process surface with light, ejecting a powder containing a processing material to the irradiated portion, and melting the powder and, more particularly, to improvement of the internal structure of a nozzle that is used for the optical processing apparatus to prevent oxidation of the processing material and properly controls the channel of a purge gas or the like, and also to a nozzle part used for the nozzle.

BACKGROUND ART

In the above technical field, patent literature 1 discloses an optical processing apparatus that ejects an inert gas to a shaped object using a processing nozzle.

CITATION LIST

Patent Literature

Patent literature 1: U.S. Pat. No. 7,223,935

SUMMARY OF THE INVENTION

Technical Problem

The technique described in the above literature poses a problem that when ejecting a fluid from the processing nozzle, outside air is engulfed and oxygen in air causes deterioration of the shaped object. It is thus desired to improve engulfment of outside air.

Especially, to prevent oxidation due to oxygen in air, a so-called purge gas is conventionally discharged near the optical path of the nozzle along the optical path. However, the present inventors have found that the purge gas itself engulfs air.

The present invention enables to provide a technique of solving the above-described problem. That is, the present invention enables to provide an optical processing nozzle that is effectively prevented from engulfing ambient air, and an optical processing apparatus including the nozzle.

The present invention enables to provide a technique of solving the above-described problem.

Solution to Problem

One aspect of the present invention provides an optical processing nozzle comprising:
an optical system in which a condensing point is adjusted to a processing point;
a first set of fluid mixture discharge pipes that discharges, to the processing point, a material/purge gas fluid mixture obtained by mixing a purge gas in a powder processing material; and
a second set of purge gas discharge pipes that discharges a purge gas having a purge function to the first set of fluid mixture discharge pipes, each of the fluid mixture discharge pipes of the first set being associated with each of the purge gas discharge pipes of the second set,
wherein first orifices of the first set of fluid mixture discharge pipes are arranged to be rotationally symmetrical with respect to a light beam path of the optical system, and
second orifices of the second set of purge gas discharge pipes are arranged so that the purge gas ejected from the ejection ports shields and protects the fluid mixture discharged from the first orifices of the first set of fluid mixture discharge pipes.

Another aspect of the present invention provides an optical processing apparatus using the aforementioned optical processing nozzle.

Advantageous Effects of Invention

According to the present invention, it is possible to prevent deterioration of a shaped object.

BRIEF DESCRIPTION OF DRAWINGS

FIG. 1 is a view for explaining a system configuration as an embodiment of an optical processing apparatus to which an optical processing nozzle is applied according to the present invention;

FIG. 6 is a view for explaining the internal structure of the nozzle 1301 according to the first embodiment of the present invention;

DESCRIPTION OF THE EMBODIMENTS

Figure 2:
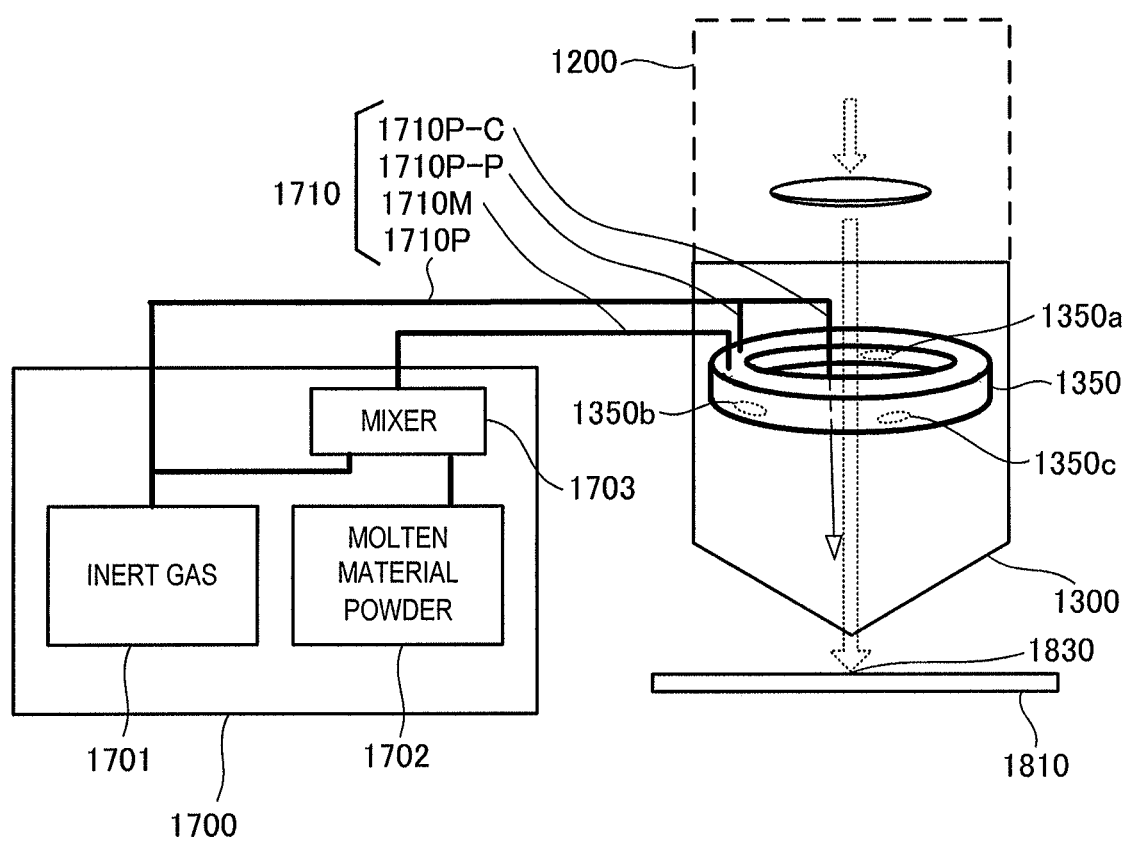
FIG. 2 is a view for explaining an interface between a nozzle (1300) and a processing apparatus (2000) according to the present invention, especially an interface for supplying a powder processing material and a purge gas to the nozzle.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A characteristic arrangement of the present invention is an "optical processing nozzle" used for optical processing. An optical processing apparatus adopting a processing nozzle 1300 according to the present invention will be described first. After that, an optical processing nozzle 1301 according to the first embodiment and an optical processing nozzle 1302 according to the second embodiment will be sequentially explained.

[Optical Processing Apparatus]

An optical processing apparatus as an embodiment to which the present invention is applied will be described with reference to FIGS. 1 to 4. FIG. 1 is a view for schematically explaining the overall arrangement of an optical processing apparatus 2000 according to this embodiment.

<<Apparatus Arrangement>>

As shown in FIG. 1, the optical processing apparatus 2000 includes, as main components, a light source 1400, an optical processing head 1000, an observation optical system 1610, a stage 1800, and a material storage unit 1700.

The light source 1400 generates a light beam for shaping of a shaped object 1810. Although a laser source can be used as the light source 1400, the present invention is not limited to this. For example, an LED (Light Emitting Diode), a halogen lamp, or a xenon lamp can be used. Note that a light beam used to melt a powder processing material as the material of the shaped object 1810 is not limited to a laser beam, and any light beam capable of melting the powder processing material at a processing point may be used. For example, the light beam may be an electron beam, a microwave, or an electromagnetic wave in the ultraviolet range.

A light transmitter 1410 transmits the light beam (for example, a laser beam) generated by the light source 1400. The light transmitter 1410 is, for example, an optical fiber having a core diameter of φ0.01 to 1 mm, and guides the light beam generated by the light source 1400 to the optical processing head 1000. The optical processing head 1000 includes a condensing optical system 1200 and the nozzle 1300.

The condensing optical system 1200 includes a focusing lens for focusing a laser beam as a light beam. The optical processing head 1000 is formed by attaching the nozzle 1300 on the downstream side of the focusing portion of the condensing optical system 1200. The laser beam supplied to the optical processing head 1000 is adjusted to condense on a process surface 1820 through an optical system (for example, a lens shown in FIG. 2) including a lens provided in the condensing optical system 1200, and the process surface 1820 is irradiated with the laser beam through the inside of the nozzle 1300. The condensing position of the laser beam can be changed by changing the lens interval of the condensing optical system 1200 or the like.

The material storage unit 1700 supplies a powder processing material, whose fluidity is improved by mixing a carrier gas, to the nozzle 1300 of the optical processing head 1000 via a material supply pipe 1710. The powder processing material is, for example, a particle such as a metal particle or a resin particle. The carrier gas is an inert gas and can be, for example, argon gas, nitrogen gas, or helium gas.

The material supply pipe 1710 is, for example, a resin or metal hose, and guides, to the nozzle 1300 of the optical processing head 1000, a powder flow prepared by mixing a powder processing material in a carrier gas.

To adjust the shaping width of the shaped object, a controller 1500 receives a shaping condition such as fine writing or bold writing, changes the output value of the laser beam from the light source 1400 in accordance with the received shaping condition, and slides the outer housing of the nozzle 1300. With this processing, the controller 1500 controls the powder spot diameter of the powder processing material to be ejected from the nozzle 1300 in accordance with the diameter of a molten pool 1830.

The observation optical system 1610 is attached to the optical processing head 1000. By displaying, on a display unit 1600 such as a display, the observation light beam guided to the observation optical system 1610, the user can observe the state of the process surface 1820 or the like.

The observation light beam including radiant light from the process surface 1820 travels through the inside of the nozzle 1300 in the opposite direction, and then reaches the condensing optical system 1200. Upon reaching the condensing optical system 1200, the observation light beam is guided to the observation optical system 1610 by an optical system provided in the condensing optical system 1200. A video of the process surface 1820 is displayed on the display unit 1600. Note that the observation light beam includes ambient light. Although the ambient light includes illumination light in a place where the optical processing apparatus 2000 is installed, the present invention is not limited to this. A light source for an observation light beam may be additionally provided outside the optical processing head 1000, and an observation light beam generated from the light source may be used as ambient light. To the contrary, for example, the reflected light of a processing light beam generated from the light source 1400 may be used as an observation light beam.

<<Powder Storage Unit>>

The cooperation operation of the material storage unit 1700 and the nozzle 1300 will be described with reference to FIG. 2.

Referring to FIG. 2, the material storage unit 1700 includes a storage unit of a powder of a molten material, a cylinder 1701 that stores an inert gas, and a mixer 1703 that mixes the inert gas from the cylinder and a molten material powder (1702). A gas output from the mixer 1703 is a mixture of the inert gas and the powder as a material for optical processing. The purpose of this inert gas is to prevent oxidation of the powder material in a region where irradiation is performed with a light beam, that is, a molten pool (processing point) 1830, by being supplied to this region. In the optical processing apparatus 2000, the inert gas is mixed in the material powder to provide fluidity to the powder, thereby facilitating supply of the material powder to the nozzle 1300 through a pipe 1710M.

In the optical processing apparatus 2000 according to this embodiment, the inert gas has a function as a shield for blowing away the external atmosphere containing oxygen and hindering the external atmosphere from coming closer to the powder in the nozzle 1300. In the optical processing apparatus 2000 according to this embodiment, the inert gas is called as follows.

(I) A "carrier gas" for carrying the powder
(II) A "purge gas" for blowing away air
(III) A "shield gas" for keeping air away
(IV) An "inert gas" for preventing oxidation In this specification, for the sake of convenience, the inert gas will be referred to as a "purge gas" or "P gas", and the "functions" of (I) to (IV) and the like are complemented by words expressing the functions before the "purge gas".

A gas flow output from the mixer 1703 and passing through a pipe 1710P is a mixture of the powder material (M) and the purge (P) gas, and will thus be referred to as a "PM fluid mixture" or "material mixed purge gas" in this specification. Note that those skilled in the art often call the fluid mixture a "carrier gas". In this specification, the inert gas pays attention more to a purge function or shield function than a carrier function. Therefore, to emphasize a mixture, the gas fluid will be referred to as a "PM fluid mixture" or "material mixed purge gas" instead of a "carrier gas".

Therefore, referring to FIG. 2, the PM fluid mixture flows through the pipe 1710M, and is sent to a distributor 1350 of the nozzle 1300.

The distributor 1350 is an apparatus that distributes the PM fluid mixture from the pipe 1710M to a plurality of nozzle discharge pipes in the nozzle 1300. The distributor 1350 is formed by a set of branch pipes since it is provided in the nozzle 1300 required to perform a quick operation.

As will be described later, in the nozzle according to this embodiment, three discharge pipes or three groups of discharge pipes are used as the nozzle discharge pipes. The lower portion of the distributor 1350 is provided with openings (1350a, 1350b, and 1350c) for passing pipes each for supplying the purge gas or PM fluid mixture to each of the nozzle discharge pipes provided on the lower side of the distributor 1350.

The practical arrangement and layout of the nozzle discharge pipes of the nozzle 1300 according to the present invention will be described in detail when a nozzle according to the first embodiment and a nozzle according to the second embodiment are explained.

In the nozzle (1301) according to each of the two embodiments of the present invention, especially the first embodiment, the purge gas flows into the pipe 1710P from the cylinder 1701, and is also sent to the distributor 1350 in the nozzle 1300.

As shown in FIG. 2, in the nozzle 1300, the pipe 1710P includes a pipe group of a branch pipe 1710P-P positioned in the peripheral portion of the nozzle and a branch pipe 1710P-C positioned at the center of the nozzle. The reason why the nozzle 1300 according to this embodiment, especially the nozzle 1301 according to the first embodiment requires the purge gas is that the purge gas from the branch pipe 1710P-P is discharged near the nozzle discharge pipes to have a function of shielding the powder fluid mixture from the external atmosphere. Furthermore, the purge gas from the branch pipe 1710P-C expels, outside the nozzle, the external atmosphere that readily circulates near the light beam path in the nozzle 1300.

<<Operation of Optical Processing Apparatus>>

The operation of the optical processing apparatus 2000 will be described. The shaped object 1810 is shaped on the stage 1800. Light (a processing light beam) exiting from the optical processing head 1000 is condensed to the process surface 1820 on the shaped object 1810. The temperature of the process surface 1820 is raised by the condensed light, and the process surface 1820 is melted, thereby forming the molten pool (processing point) 1830 on part of the process surface 1820.

The powder processing material is ejected from the nozzle 1300 to the molten pool 1830 on the process surface 1820. The ejected powder processing material is melted into the molten pool 1830. After that, the molten pool 1830 is cooled and hardened to deposit the powder processing material on the process surface 1820, thereby implementing three-dimensional shaping.

Helium gas, argon gas, nitrogen gas, or the like may be used as a gas called an "inert gas", "carrier gas", "purge gas", or "purge/shield gas".

As practical arrangement examples of the nozzle apparatus 1300, the arrangement and operation of the nozzle 1301 according to the first embodiment will be described with reference to FIGS. 2, 3, 5, and 6, and the arrangement and operation of the nozzle 1302 according to the second embodiment will be described with reference to FIGS. 4 and 7 to 9.

<<Arrangement and Operation of Nozzle 1301>> . . . First Embodiment

Figure 3:
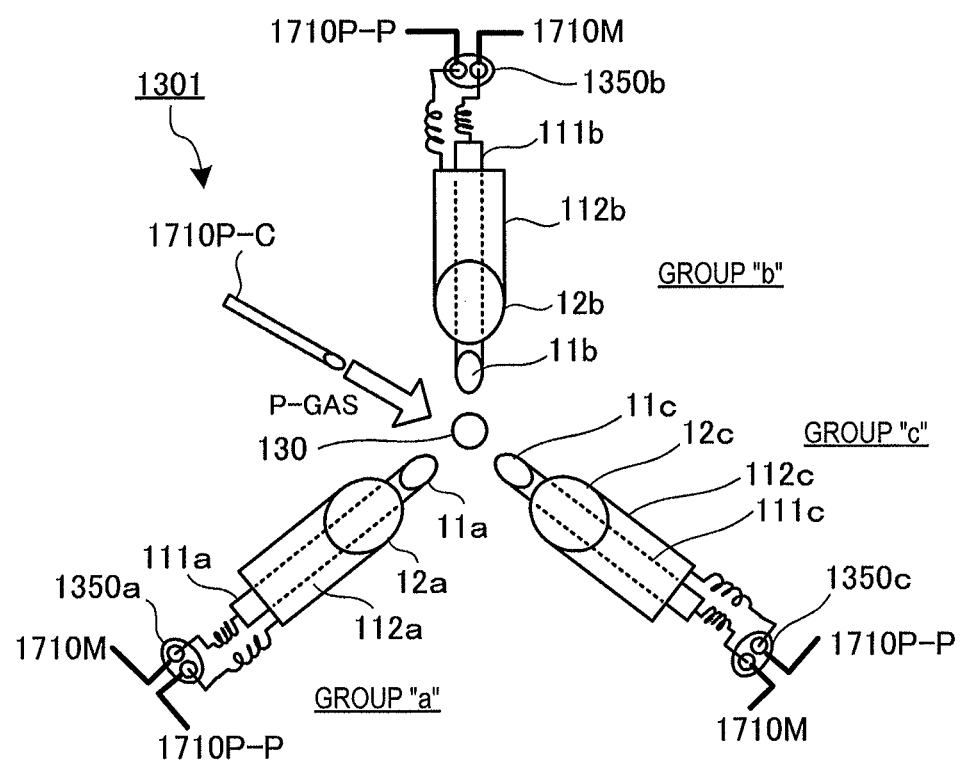
FIG. 3 is a view for explaining the arrangement of nozzle discharge pipes of groups "a" to "c" of an optical processing nozzle 1301 according to the first embodiment of the present invention.
Figure 4:
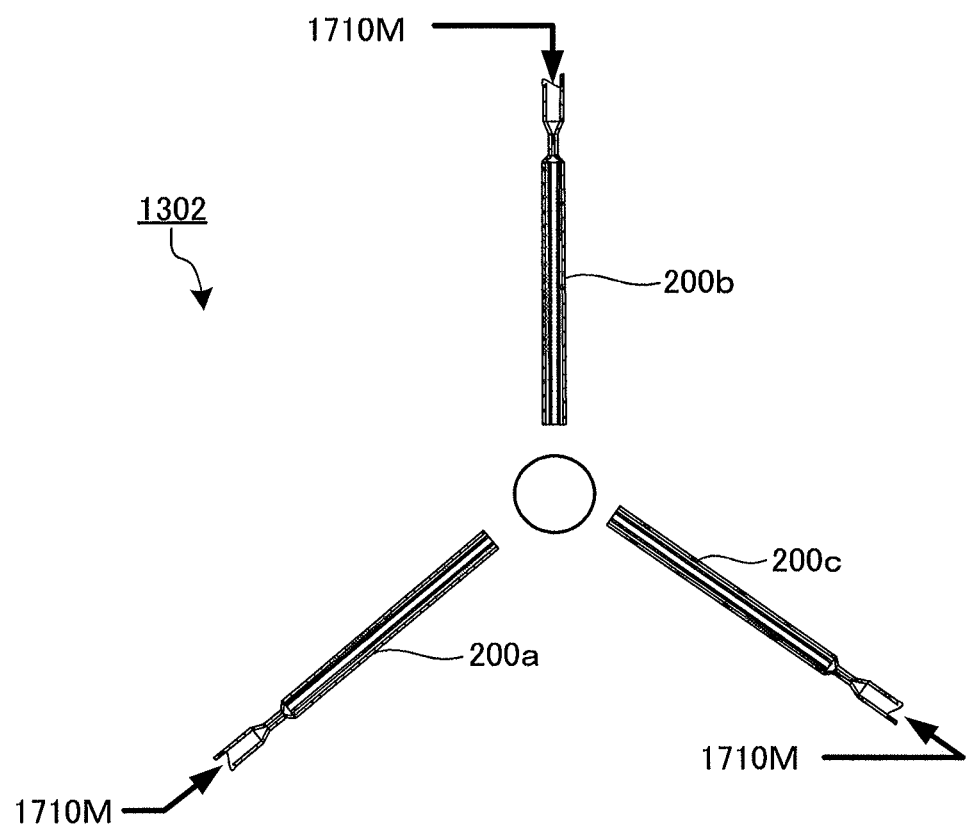
FIG. 4 is a view for explaining the arrangement of nozzle discharge pipes 200a, b, c (collectively "200") of groups "a" to "c" of a nozzle 1302 according to the second embodiment of the present invention.

FIG. 3 shows the correspondence between three groups of nozzle discharge pipes used for the nozzle 1301 according to the first embodiment and three pipe extraction openings (1350a, 1350b, and 1350c) of a distributor 1350 respectively corresponding to the nozzle discharge pipe groups (a, b, and c). FIG. 4 shows the correspondence between three groups of nozzle pipes used for a nozzle 1302 according to the second embodiment and groups in the distributor 1350 respectively corresponding to the nozzle pipes of the groups.

The nozzle 1301 to which the present invention is applied requires at least two groups of nozzle pipes so that a powder flow which is uniform as much as possible is discharged around a light beam. In this specification, as an example of the number of groups, the three groups of nozzle pipes are used.

Figure 5:
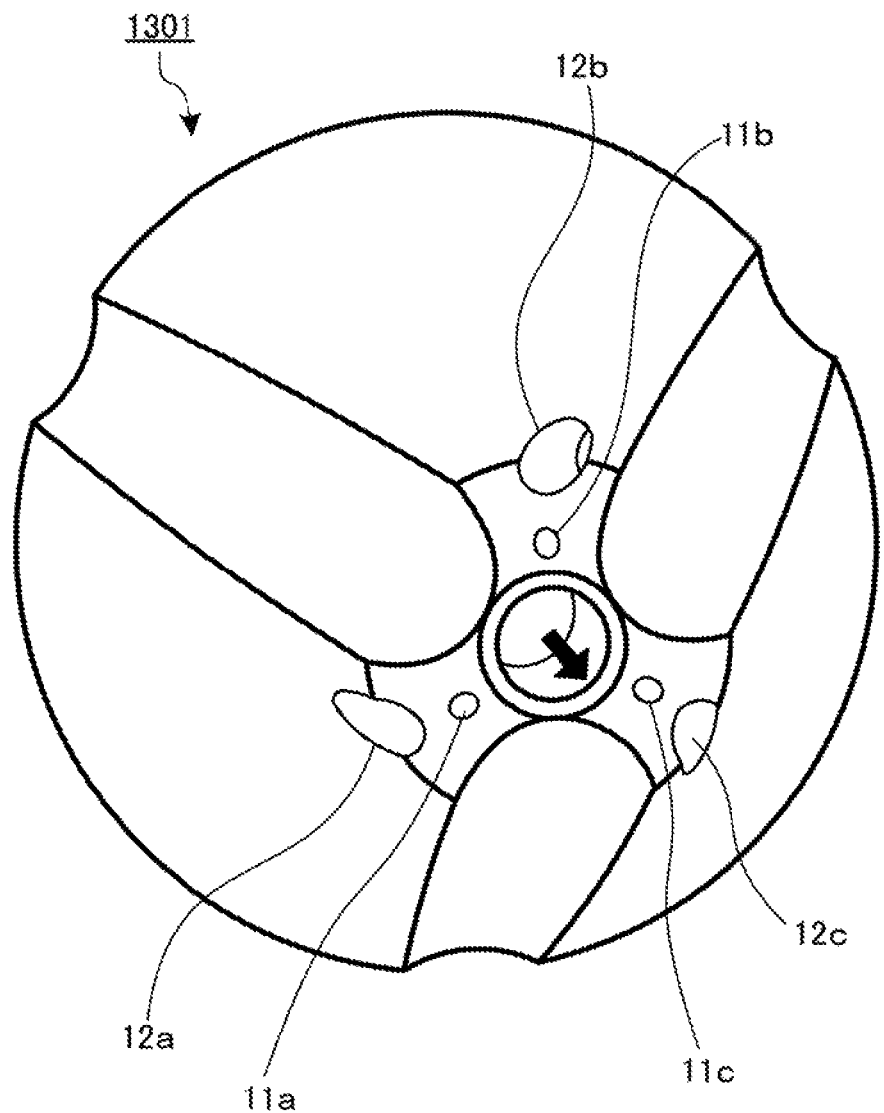
FIG. 5 is a view for explaining the outer shape of the nozzle 1301 according to the first embodiment of the present invention as shown in FIG. 3.

FIG. 4 shows the outer appearance of the nozzle 1301 according to the first embodiment, and FIG. 6 is an internal cutaway view showing the nozzle 1301. FIG. 5 shows the arrangement of the nozzle pipes.

As shown in FIG. 3, the nozzle 1301 according to the first embodiment uses the three nozzle discharge pipes (or three sets of nozzle discharge pipes), and is thus divided into three regions assigned with letters "a" to "c" for the sake of convenience.

A "set" of nozzle discharge pipes used in the nozzle 1301 according to the first embodiment includes, in, for example, a group a, a nozzle pipe 111a that receives a PM fluid mixture from a pipe 1710M and discharges it toward a processing point, and a discharge pipe 112a that receives a purge gas from a pipe 1710P-P and discharges it. The discharge pipe 112a includes an orifice 11a to discharge a material/inert gas fluid mixture to the vicinity of a molten pool 1830 as the condensing point of the light beam. The discharge pipe 112a for discharging the purge gas includes an orifice 12a at a position below the orifice 11a of the material fluid mixture.

A group b includes a nozzle pipe 111b that receives the PM fluid mixture from the pipe 1710M and discharges it toward the processing point (molten pool) 1830, and a discharge pipe 112b that receives the purge gas from the pipe 1710P-P and discharges it. The discharge pipe 111b includes an orifice 11b to discharge a material/inert gas fluid mixture to the vicinity of the molten pool 1830 as the condensing point of the light beam. The discharge pipe 112b for discharging the purge gas includes an orifice 12b at a position below the orifice 11b of the material fluid mixture.

The same applies to the discharge pipes of a group c (i.e., 11c, 12c, 111c, 112c, and 1350c). As shown in FIG. 3, the nozzle 1301 according to the first embodiment is provided with the discharge pipes (a branch pipe 1710P-C in FIG. 3) that discharges the purge gas received via the branch pipe 1710P-C from the material storage unit 1700, and the distal end port of the discharge pipe is provided at a position near the center of the nozzle 1301. The discharge pipe 1710P-C thus discharges the purge gas in a direction along the optical axis of the processing light beam traveling along the central axis of the nozzle 1301.

On the other hand, the three discharge pipes (11a, 11 b, and 11c) each for blowing the material fluid mixture intersect the optical axis as the path of the laser beam, and surround the optical axis. Therefore, the powder flow blown from the three discharge pipes (11a, 11 b, and 11c) almost form a ring to surround the optical axis of the light beam, thereby attempting to trap the external atmosphere around the axis of the light beam. However, the external atmosphere that is readily trapped is expelled from a space near the laser beam path by the purge gas flowing from the discharge pipe 1710P-C along the central axis of the nozzle.

The three discharge pipes 112a to 112c also surround the optical axis of the laser beam, and are positioned outside and below the discharge pipes (111a to 111c) of the powder gas, and the discharge pipes (111a to 111c) intersect the optical axis as the path of the laser beam and surround the optical axis. Furthermore, the three nozzle discharge pipes 112a to 112c for the purge gas are arranged so as not to intersect the directions of the powder gas discharge pipes (111a to 111c) and to block the line segments of the directions of the powder gas discharge pipes (111a to 111c), as explicitly shown in FIG. 5. For these reasons, the purge gas discharge pipes (112a to 112c) are surrounded.

That is, the powder processing material blown from the powder gas discharge pipes (111a and 111b) is sandwiched between a layer of the purge gas discharged from the discharge pipe 1710P-C along the center line of the optical axis and the purge gas from the three discharge pipes (112a to 112c) that do not intersect the powder gas discharge pipes (111a and 111b) and discharge the purge gas outside the powder gas discharge pipes. Instead of the sandwich state, the purge gas from the purge gas discharge pipes (112a to 112c) can form a shield layer or protection layer against the external atmosphere for the powder from the powder discharge pipes 111a to 111c, thereby effectively preventing oxidation of the powder.

Although the nozzle 1301 according to the first embodiment is provided with the three sets (or three groups) of discharge pipes (111a to 111c) for discharging the powder gas fluid mixture, the number of sets (groups) is not specifically limited to this. At least two or more discharge pipes may be arranged to be rotationally symmetrical with respect to the light beam path. Near the ejection ports of the purge gas discharge pipe groups (112a to 112c), the ejection ports of the powder gas discharge pipes (111a to 111c) respectively corresponding to the purge gas discharge pipe groups are included. Note that rotational symmetry indicates that when a target is rotated about an axis of rotational symmetry, a shape matches the original one at a rotation angle of 360° or less.

<<Arrangement and Operation of Nozzle 1302>>.
. . Second Embodiment

The "shield" layer formed by the purge gas of the nozzle according to the first embodiment is formed by supplying the purge gas from the powder storage unit via another route (1710P) different from that (pipe 1710M) of the PM fluid mixture, and discharging it from the nozzle discharge pipes (111a to 111c).

The nozzle 1302 according to the second embodiment has as its feature that it can form a shield layer by the purge gas even if the purge gas is not independently supplied from a powder storage unit 1700. That is, in the second embodiment, a nozzle discharge pipe having a special structure (double pipe structure) is used to separate a purge gas (inert gas) and a powder processing material from a fluid mixture of the purge gas and powder processing material, and the purge gas (inert gas) and the powder processing material are respectively separated into outer and inner pipes, thereby "automatically" shielding the inner powder processing material by the outer purge gas layer.

The processing nozzle (1302) according to the second embodiment will be described with reference to FIGS. 4 and 7 to 9.

Figure 7:
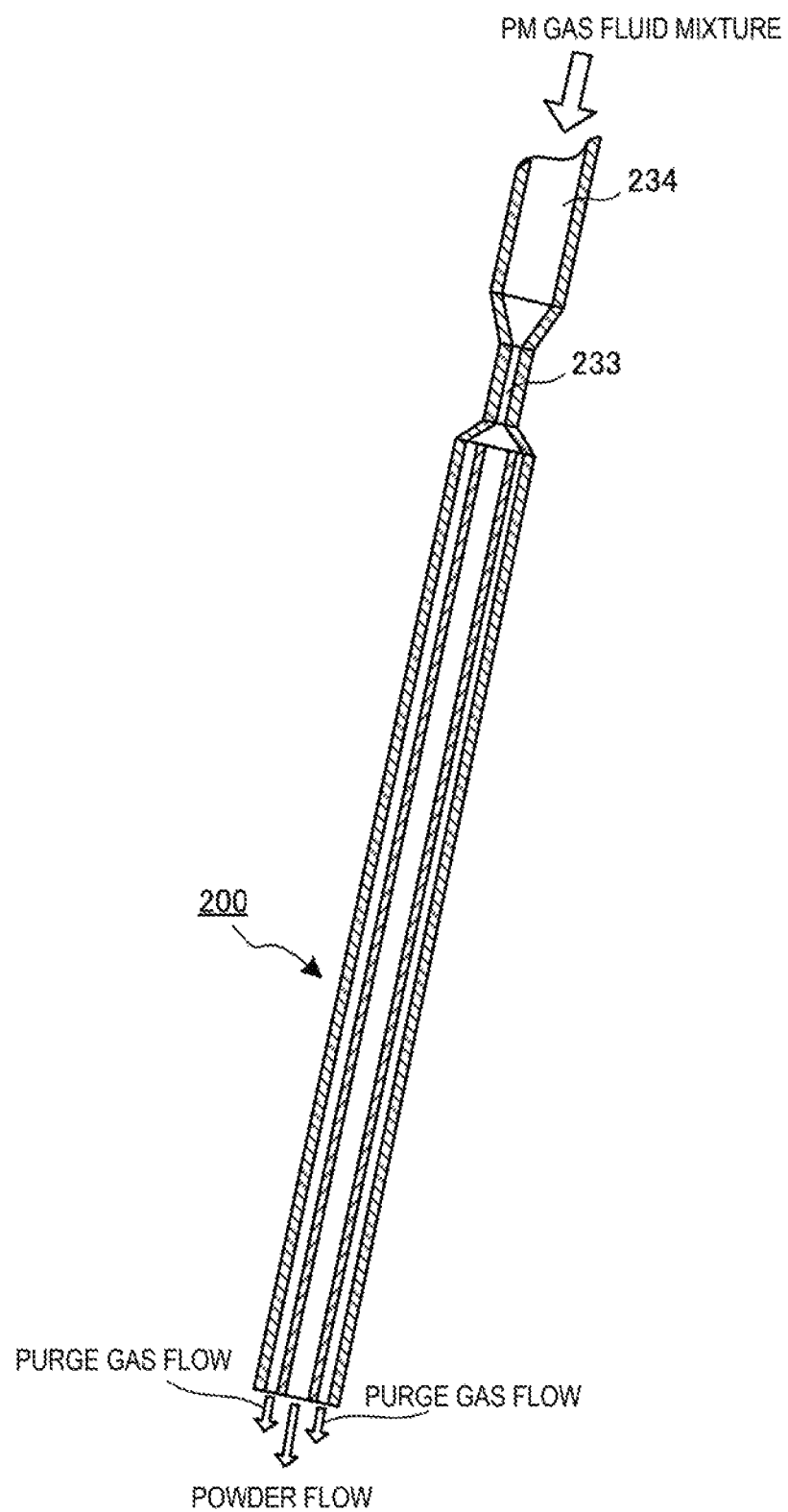
FIG. 7 is a view for explaining the arrangement of a nozzle discharge pipe 200 used for the nozzle apparatus 1302 according to the second embodiment of the present invention.
Figure 8:
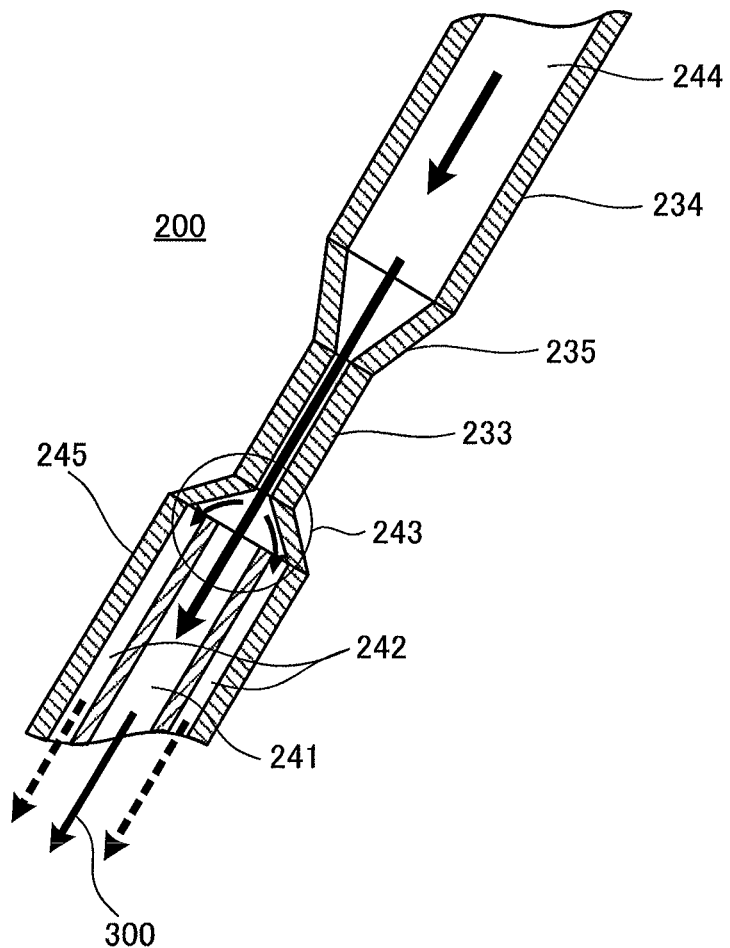
FIG. 8 is a view for explaining the internal structure of the nozzle discharge pipe 200 used for the nozzle apparatus 1302 according to the second embodiment of the present invention, especially the principle of separating a PM fluid mixture into a powder processing material and a purge gas, and extracting them.

FIG. 7 is a schematic perspective view showing a double structured discharge pipe 200 of the nozzle 1302 according to the second embodiment. Three double structured discharge pipes 200 shown in FIG. 7 are used and arranged in the nozzle 1302 to be rotationally symmetrical, as shown in FIG. 4.

The double structured discharge pipe 200 according to the second embodiment supplies, from a right supply port 234 shown in FIG. 7, a PM fluid mixture as a mixture of the purge gas and the powder processing material. This PM fluid mixture is supplied from the powder storage unit 1700 via a pipe 1710M (see FIG. 4), similarly to the first embodiment.

The supply port 234 for sucking an integral material/gas mixture jet flow has a single structure. The inner diameter of the suction portion 234 serving as a supply port is constant. The suction portion 234 is connected to an inner diameter reduced portion 235 whose inner diameter gradually decreases, and to a narrow portion 233 while keeping a sectional area small. The reason why the inner diameter of the inner diameter reduced portion 235 is "gradually decreased" is to prevent unnecessary turbulence from occurring in the flow of the inner fluid.

The fluid velocity in the narrow portion 233 is decided based on the inner diameter of the narrow portion 233 having a constant area. Since the radius of the narrow portion 233 is smaller than that of the suction portion 234, a pipe traveling speed (244) of the material/gas mixture in the narrow portion 233 is higher than that in the suction portion 234.

Since the flow velocity in the narrow portion 233 is high, the velocity of the powder having a large mass in the PM gas fluid is also high. Thus, the momentum of the powder flow is overwhelmingly larger than that of the purge gas having a small mass. In other words, in the narrow portion 233, the inertia of the powder is overwhelmingly higher than that of the purge gas. Since the narrow portion 233 is set to have a predetermined small radius and a given length, the traveling speed of the powder in the fluid is subject to not a decelerated motion but an accelerated motion or a high-speed uniform motion at the latest near the end point of the narrow portion 233.

As described above, while the powder has overwhelmingly high inertia, the processing material and the purge gas (molecules thereof) whose traveling speeds are equal to each other reach an inner diameter enlarged portion (243) whose inner diameter abruptly increases.

In the inner diameter enlarged portion (243), the pressure on the central axis in the pipe is highest, and hardly changes. A change in pressure becomes larger toward the periphery.

That is, the change in pressure applies, to the powder and purge gas molecules, a force for guiding the powder and purge gas in the direction to separate from the central axis.

At this time, even if the processing material making a high-speed translatory movement and having high inertia reaches the inner diameter enlarged portion 243, it still has high inertia, and thus attempts to move straight to conserve the momentum. To the contrary, the purge gas molecules are expelled toward the periphery. A change in motion in which the powder processing material continues the translatory movement and the purge gas molecules move toward the periphery of the pipe passage is observed in the inner diameter enlarged portion 243.

In other words, when the powder/gas fluid mixture exits from the inner diameter enlarged portion 243, only the powder is collected around the central axis of the channel and only the purge gas molecules are collected near the inner wall of the pipe passage. That is, the purge gas of the power/purge gas fluid mixture is separated from the powder.

This separated state is fixed by the pipe wall of the inner pipe of the double pipe when the fluid reaches a double pipe portion 245. That is, the powder particles are immobilized in an inner pipe passage 241 of the double pipe and the purge gas molecules are immobilized in an outer pipe passage 242. The purge gas molecules in the outer pipe passage 242 never return to the powder flow in the inner pipe passage 241.

The nozzle 1302 according to the second embodiment is superior in that the powder flow is shielded by the purge gas or inert gas in all directions of 360° including the velocity direction of the powder fluid and a surface direction perpendicular to the velocity direction.

In the first embodiment, the degree of oxidation/deterioration depends on the number of nozzle pipes for supplying the purge gas as a shield with respect to the nozzle pipe for supplying a powder flow. This is because the shield effect by the purge gas cannot be expected in a location where no nozzle pipe for supplying the purge gas is provided.

To the contrary, in the nozzle pipe according to the second embodiment, the PM fluid mixture can expect the shield effect by the purge gas through 360° in the traveling direction.

Modification of Second Embodiment

Figure 9:
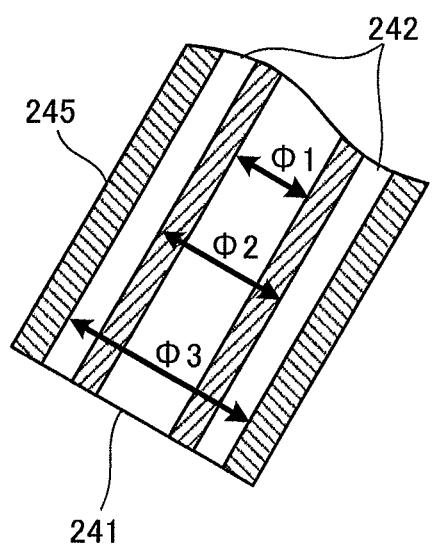
FIG. 9 is a view for explaining a condition for effectively suppressing the occurrence of turbulence in an orifice of the discharge pipe 200 according to the second embodiment of the present invention.

FIG. 9 is an enlarged view showing the double pipe portion 245 of the PM fluid mixture discharge pipe 200 according to the second embodiment. The double pipe portion includes the inner pipe passage 241 and the outer pipe passage 242. The inner diameter and outer diameter of the inner pipe passage 241 are respectively represented by φ1 and φ2, and the inner diameter of the outer pipe passage 242 in which the separated purge gas is expected to operate as a shield is represented by φ3.

In order for the discharge pipe 200 according to the second embodiment to separate the purge gas from the powder/purge gas fluid mixture gas while separation accuracy from the powder is high, if the volume per unit time of the powder flow in the inner pipe passage 241 is equal to that of the purge gas flowing through the outer pipe passage 242, even if the PM fluid mixture flows into the double structured discharge pipe 200 according to the second embodiment and flows out from there, the momentum is conserved, and thus the separated purge gas flow and powder flow do not cause turbulence at the exit of the double structured discharge pipe 200. In other words, if the ejection velocity of the discharge pipe for the powder becomes equal to that for the purge gas, no turbulence occurs. Thus, the radii φ1 to φ3 are adjusted so that the velocities of the purge gas and powder flow are equal to each other. This is equivalent to equalization of the sectional area of the outer pipe passage 242 of the purge gas and that of the inner pipe passage 241 of the powder flow. The condition at this time is given by:

$$\phi_3 = 2\sqrt{\left(\frac{\phi_1}{2}\right)^2 - \left(\frac{\phi_2}{2}\right)^2} \qquad (1)$$

By designing the double structured discharge pipe 200 so as to satisfy this condition, no turbulence occurs and it is possible to optimally control prevention of oxidation of the powder.

In the above embodiment, the fluid mixture of the powder and purge gas is manufactured in the material storage unit 1700. The fluid mixture may be prepared on the nozzle side. In this case, an increase in weight of the head when hardware necessary to prepare the fluid mixture of the powder and gas is brought in the nozzle and an increase in resistance when the powder is sent to the nozzle head without the carrier gas are considered.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. An optical processing nozzle comprising:
an optical system in which a condensing point is adjusted to a processing point;
a set of pipes that receives a material/purge gas fluid mixture obtained by mixing a purge gas with a powder processing material, separates the material/purge gas fluid mixture into a separated powder processing material and separate purge gas, and discharges separated gases to the processing point;
wherein first orifices of said set of pipes are arranged to be rotationally symmetrical with respect to a light beam path of said optical system, and
wherein each pipe of said set of pipes includes an integrated discharge pipe structure,
wherein the integrated discharge pipe structure includes an inner circular pipe and an outer circular pipe that are concentric and have a double structure,
wherein the integrated discharge pipe structure includes:
a first single pipe passage portion that supplies the material/purge gas fluid mixture, and a second single pipe passage portion having at least a portion that has an inner diameter that changes in order to gradually raise an internal pressure of the fluid mixture to a first pressure to perform preprocessing for separating the material/purge gas fluid mixture into the separated powder processing material and separated purge gas, maintain the first pressure for a predetermined time, and then gradually lower the first pressure, wherein the second single pipe passage portion is connected to the inner circular pipe and the outer circular pipe, the separated powder processing material is extracted and flows into the inner circular pipe, and the separated purge gas is extracted and flows into the outer circular pipe, and wherein the inner circular pipe and the outer circular pipe are arranged such that the separated purge gas shields the separated powder processing material.

2. The optical processing nozzle according to claim 1, wherein the second single pipe passage portion includes:
   a first single circular pipe portion wherein the inner diameter gradually decreases to a value smaller than an inner diameter of the first single pipe passage portion,
   a second single circular pipe portion that has a constant inner diameter and a predetermined length, and
   a third single circular pipe portion wherein the inner diameter gradually increases.

3. The optical processing nozzle according to claim 2, wherein a decrease rate of the diameter of the first single circular pipe portion per unit length is smaller than an increase rate of the diameter of the third single circular pipe portion per unit length.

4. The processing nozzle according to claim 2, wherein the powder processing material in the predetermined length of the second single circular pipe portion is free from turbulence when a moving speed of the powder processing material flowing through an inside of the second single circular pipe portion becomes constant with respect to all powder portions.

5. The processing nozzle according to claim 1, wherein the diameters of the inner circular pipe and the outer circular pipe of the integrated discharge pipe structure are decided so that a flow velocity of the separated and extracted powder processing material discharged from the inner circular pipe is equal to a flow velocity of the separated and extracted purge gas discharged from the outer circular pipe.

6. The processing nozzle according to claim 5, wherein the processing nozzle satisfies $$\phi_3 = 2\sqrt{\left(\frac{\phi_1}{2}\right)^2 - \left(\frac{\phi_2}{2}\right)^2} \qquad (1)$$

where φ1 represents an inner diameter of the inner circular pipe at an ejection port, φ2 represents an outer diameter of the inner circular pipe at the ejection port, and φ3 represents an inner diameter of the outer circular pipe at the ejection port.

7. An optical processing apparatus using an optical processing nozzle defined in claim 1.

8. The optical processing apparatus according to claim 7, further comprising:
   a powder storage unit and a purge gas storage unit; and
   a pipe system that individually sends, to the optical processing nozzle, a purge gas and a powder/purge gas fluid mixture obtained by mixing the purge gas and a powder processing material.

9. The optical processing apparatus according to claim 7, further comprising:
   a powder storage unit and a purge gas storage unit; and
   a pipe system that sends, to the optical processing nozzle, a powder/purge gas fluid mixture obtained by mixing a purge gas and a powder processing material.

* * * * *